G. B. CASWELL.
OVEN GRILL.
APPLICATION FILED MAR. 29, 1920.

1,352,352.

Patented Sept. 7, 1920.
2 SHEETS—SHEET 1.

WITNESSES

INVENTOR
G. B. CASWELL
BY Munn & Co
ATTORNEYS

G. B. CASWELL.
OVEN GRILL.
APPLICATION FILED MAR. 29, 1920.
1,352,352. Patented Sept. 7, 1920.
2 SHEETS—SHEET 2.
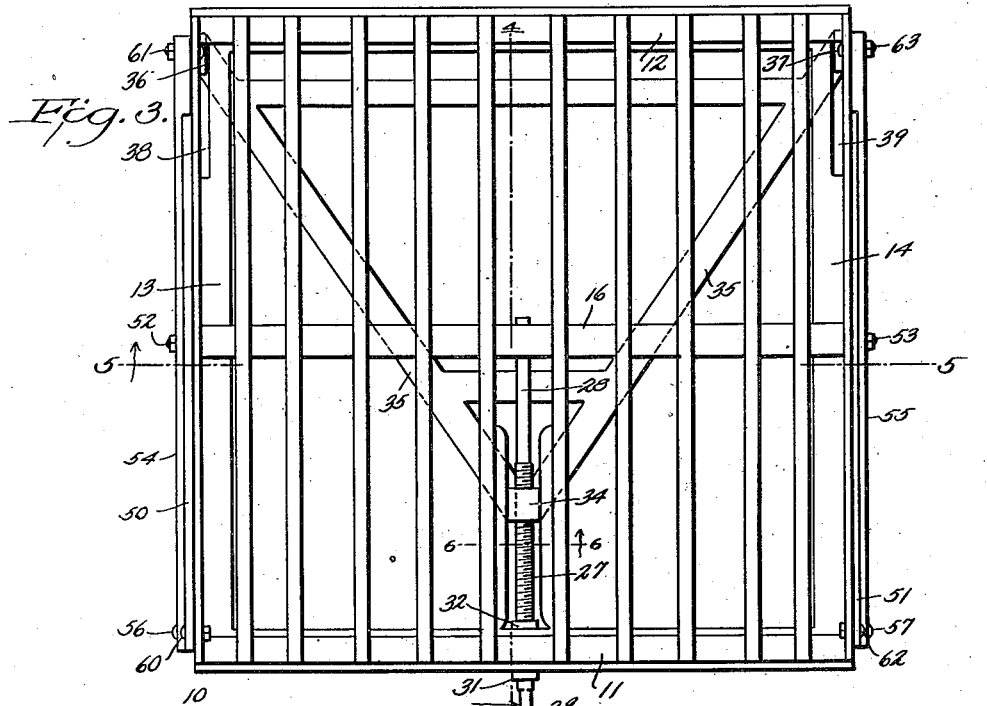
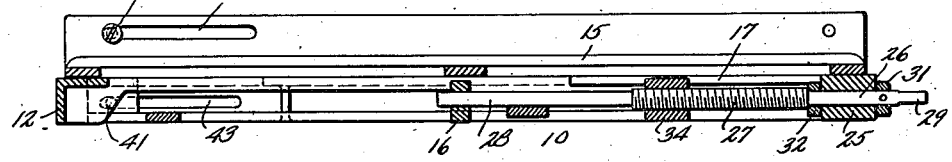
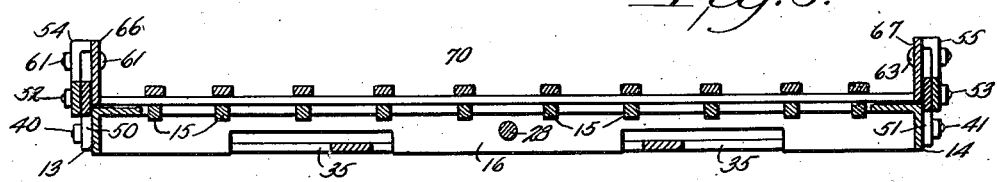
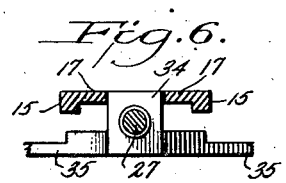
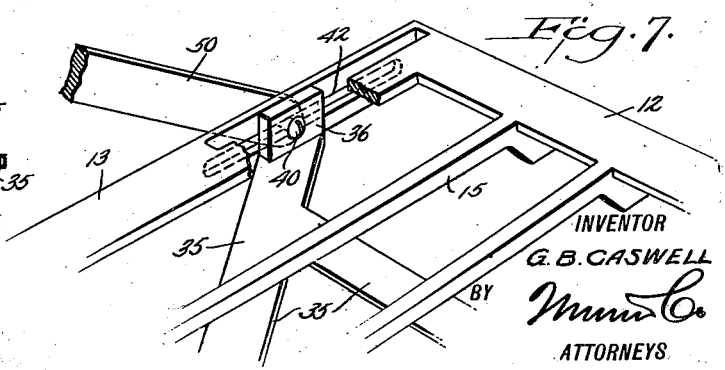
WITNESSES
INVENTOR
G. B. CASWELL
BY
ATTORNEYS

UNITED STATES PATENT OFFICE.

GEORGE BARKER CASWELL, OF FORT TERRY, NEW YORK.

OVEN-GRILL.

1,352,352.  Specification of Letters Patent.  Patented Sept. 7, 1920.

Application filed March 29, 1920. Serial No. 369,739.

*To all whom it may concern:*

Be it known that I, GEORGE B. CASWELL, a citizen of the United States, and a resident of Fort Terry, in the county of Suffolk and State of New York, have invented a new and Improved Oven-Grill, of which the following is a full, clear, and exact description.

The invention relates to kitchen stoves and ranges, and its object is to provide a new and improved grill fitting into the oven and adapted to support one or more food containers and arranged to permit the user to readily raise the containers from normal lowermost position to any desired height in the oven without danger of spilling the food contents of the container, shaking it or otherwise handling it to the detriment of the food contained in the container.

Another object is to securely hold the grill in the adjusted position.

Another object is to permit the user to readily place the food container or food containers in position on the grill or to remove the same therefrom whenever it is desired to do so.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 3 is a plan view of the oven grill;

Fig. 4 is an enlarged cross section of the same on the line 4—4 of Fig. 3;

Fig. 5 is an enlarged sectional front elevation of the same on the line 5—5 of Fig. 3;

Fig. 6 is a similar view of a portion of the same on the line 6—6 of Fig. 3; and Fig. 7 is an enlarged perspective view of a portion of the base and one of the lazy tong members.

Figure 1:
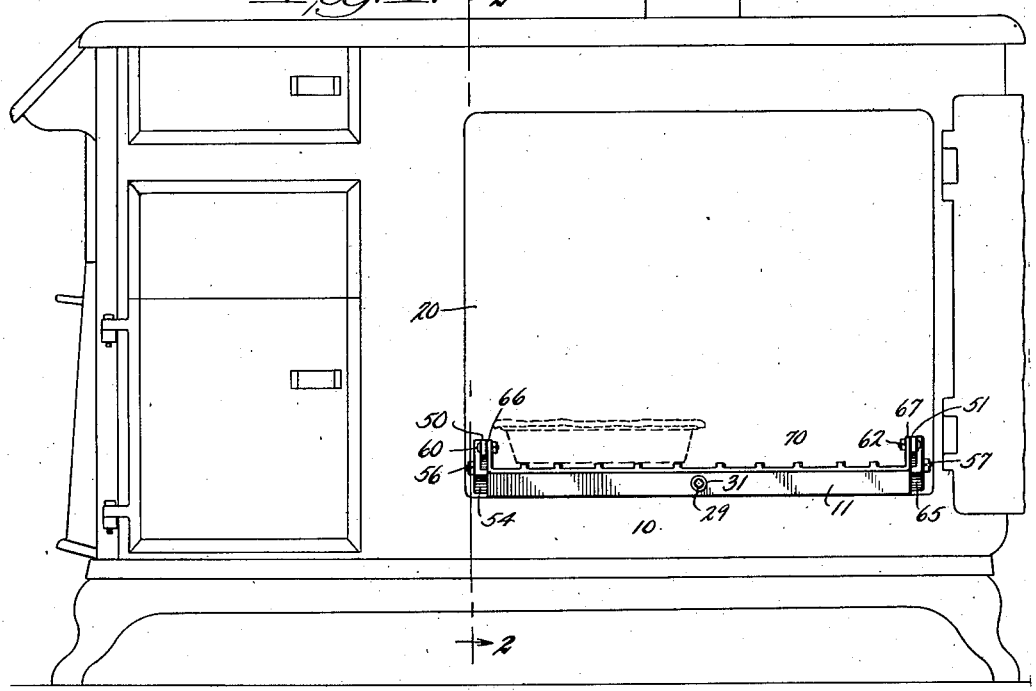
Figure 1 is a front elevation of the oven grill in normal lowermost position within the oven of a kitchen range.

The oven of an ordinary cook stove or range is usually provided with bottom and top grills for supporting a food container on either of the grills. In baking pies, for instance, the pie plates are first placed on the lower grill and left there until the under crust of the pie is cooked, and in order to properly brown the pies on the top, the cook removes the pie plates from the lower grill and places the same on the upper grill thus subjecting the top of the pies to the high heat in the upper portion of the oven with a view to brown the tops of the pies. Now it will be noticed that in transferring the pies from the lower grill to the upper grill considerable care must be exercised to prevent the " filling " of the pie from " falling " and to avoid burning of the hands. Careless handling of pies, cakes, bread or biscuits is usually fatal to their being light. It will also be noticed that in transferring the food containers from lowermost to uppermost position or vice versa it is necessary to hold the container in a perfectly level position or else the food in the container is liable to be thrown more to one side than to the other. With the improved oven grill presently to be described in detail the above mentioned defects are completely avoided and the food containers can be raised or lowered without being touched by the cook and without being moved out of level position or shaken.

The base 10 of the oven grill is in the form of a rectangular grated frame having the front, rear and side members 11, 12, 13 and 14, respectively. Grate bars 15 are connected with the front and rear frame members 11 and 12 and a crossbar 16 connects the side members 13 and 14 with each other and support the grate bars 15 intermediate the front and rear frame members 11 and 12. The two middle grate bars 15 form a transverse guideway 17. The base 10 is adapted to rest on the bottom of the oven 20 and is approximately of a size corresponding to the oven bottom.

On the middle of the front member 11 of the frame 10 is formed or secured a bearing 25 in which is journaled the forward reduced end 26 of a screw rod 27 having its rear non-threaded end 28 journaled in the crossbar 16 of the base 10. The front reduced end 26 terminates in a polygonal portion 29 adapted to be engaged by a crank or similar tool 30 for turning the screw rod 27. Collars 31 and 32 are secured on the reduced end 26 and abut against the front and back of the bearing 25 to hold the screw rod 27 against transverse movement. On the screw rod 27 screws a nut 34 mounted to slide in the transverse guideway 17 forming part of the base 10, and the said nut 34 is secured or formed on the forward apex end of a triangular frame 35 provided at the rear ends of its diverging sides with upwardly extending lugs 36 and 37 mounted to slide in guideways 38, 39 formed in the rear ends of the side members 13 and 14 of the base 10. The lugs 36 and 37 are provided with pivots 40, 41 slidingly engaging slots 42, 43 formed in the rear portions of the side members 13 and 14 of the base 10. The pivots 40 and 41 connect with the lower ends of the lazy tong members 50, 51 pivotally connected at their middle by pivots 52, 53 with lazy tong members 54, 55 provided at their lower ends with pivots 56, 57 held in the front portions of the side members 13 and 14. The upper ends of the pairs of lazy tong members 50, 54 and 51, 55 are provided with pivots 60, 61, 62, 63, of which the pivots 60, 62 are held in the front portions of side supporting bars 66 and 67 forming part of a grated platform 70 adapted to support one or more food containers, and the said pivots 61 and 63 engage slots 71, 72 formed in the rear ends of the said side supporting bars of the platform 70. By the arrangement described, the platform 70 is carried by the pairs of lazy tong members 50, 54 and 51, 55 slidingly connected at their lower ends with the side members 13 and 14 of the base 10.

Figure 2:
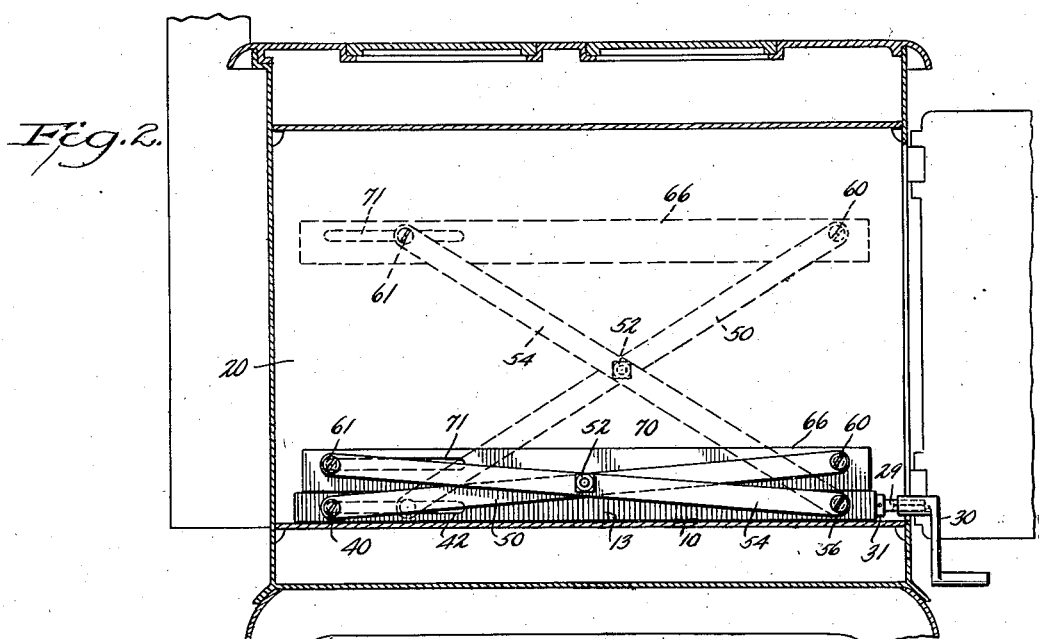
Fig. 2 is a transverse section of the same on the line 2—2 of Fig. 1.

Normally the pairs of lazy tongs 50, 54, 51, 55 are in folded lowermost position, as indicated in Figs. 1, 2, 3, 4 and 5, and when it is desired to bake pies, for instance, then the containers of the pies are placed on the platform 70 (see Fig. 1) for a desired length of time, that is, until the under crust of the pies is properly cooked. When this has been done, the cook applies a crank 30 or other tool to the polygonal terminal 29 of the screw rod 27 and then turns the latter to cause the nut 34 to travel forward on the screw rod 27 whereby the frame 35 is likewise moved forwardly and its pivots 40, 41 impart a swinging motion to the lazy tong members 50, 51, and as both pairs of lazy tong members 50, 54 and 51, 55 are pivotally and slidingly connected with the side supporting bars 66, 67 of the platform 70 it is evident that both pairs of lazy tongs open simultaneously with the pivots 40, 41 sliding forward in the slots 42, 43 of the base sides 13 and 14, and the pivots 61 and 63 sliding forwardly in the slots 71 and 72 of the side bars 66 and 67 of the platform 70. It will be noticed that the platform 70 is in parallelism from a lowermost to an uppermost position, thus lifting the food containers within the oven 20 whereby the food containers come in contact with the higher heat in the upper portion of the oven to insure proper browning of the tops of the pies. When the pies have been finished they can be readily removed from the platform 70 and the latter can be lowered back to normal lowermost position by the cook turning the screw rod 27 in a reverse direction. The side bars 66 and 67 are of sufficient height to extend above the body portion of the platform to form guards at the sides of the platform to prevent dishes from contacting with the sides of the oven 20. From the foregoing it will be seen that by the arrangement described it is not necessary for the cook to handle the hot pie plates for transferring the same from a lower grill to an upper grill or vice versa, and the food in the containers is not disturbed during the transferring operation.

The oven grill shown and described is very simple in construction and can be readily placed into the oven 20 or removed therefrom whenever it is desired to do so. It will be noticed that the oven is not liable to unduly cool while raising or lowering the food containers in the oven as it takes but a very short time to move the platform 70 from lowermost into uppermost position or vice versa, and hence the door of the oven need not be kept open for any great length of time.

Having thus described my invention, I claim as new and desire to secure by Letters Patent:—

1. An oven grill adapted to fit into the oven of a cooking stove, comprising a grated base adapted to be supported in the lower portion of the oven, an open frame mounted to slide transversely on the said base and provided at its forward end with a nut, a transverse screw rod mounted to turn on the said base and screwing in the said nut to move the open frame forward or backward, a grated platform and lazy tong connections pivoted on the base and connecting the said frame with the said platform.

2. An oven grill adapted to fit into the oven of a cooking stove, comprising a grated base adapted to rest on the bottom of the oven and provided with a transverse guideway at the middle and transverse guideways at the rear of the sides of the base, an open frame having a nut at its forward end engaging the said middle guideway, the frame having rear lugs slidingly engaging the said side guideways of the base, a screw rod journaled on the said base and screwing in the said nut, a grated platform and lazy tong connections pivoted on the base and pivotally connected with the said platform.

3. An oven grill adapted to fit into the oven of a cooking stove, comprising a base having slotted side bars, a screw rod journaled on the base and extending transversely approximately at the middle of the base, the forward end of the screw rod having means for turning the screw rod, a nut screwing on the said screw rod, a rearwardly extending frame carrying the said nut, lazy tongs at each side of the grill and each having a pair of members pivotally connected with each other at their middle, the lower end of one of the lazy tong members of a pair being pivotally connected with the corresponding side member of the base, and the other lazy tong member of a pair being slidably connected with the slot in the corresponding side member of the base, a platform adapted to support a food container and having slotted side members supporting the said platform and pivotally connected with the upper end of said lazy tong member of a pair and slidingly connected with the upper end of the other member of the pair of lazy tong members.

GEORGE BARKER CASWELL.